May 29, 1956
C. B. KREKELER
2,747,852
CUTTER BITS IN CUTTER CHAIN SOCKETS
Filed May 4, 1953
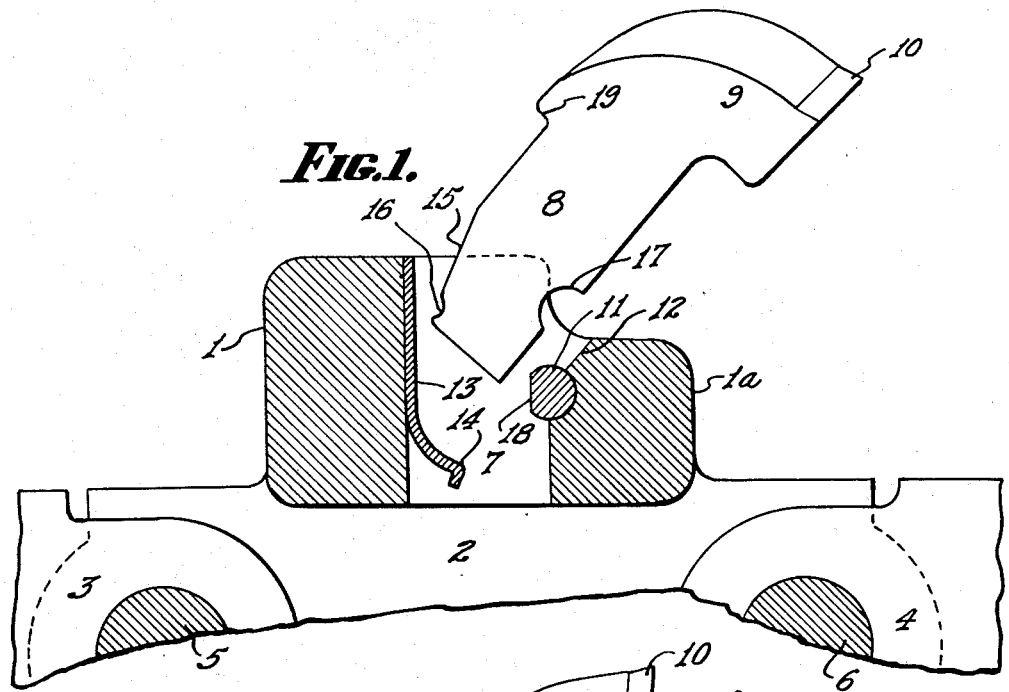
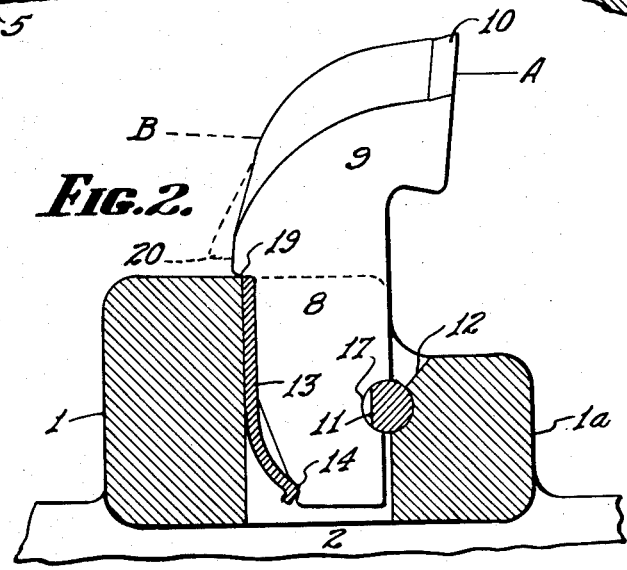
INVENTOR.
CLAUDE B. KREKELER
BY
Allen & Allen
ATTORNEYS.

United States Patent Office 2,747,852
Patented May 29, 1956

2,747,852

CUTTER BITS IN CUTTER CHAIN SOCKETS

Claude B. Krekeler, Cincinnati, Ohio, assignor to The Cincinnati Mine Machinery Company, Cincinnati, Ohio, a corporation of Ohio Application May 4, 1953, Serial No. 352,759

10 Claims. (Cl. 262—33)

As is well known, in mining machinery, cutter bits held in suitable sockets on the links of a cutter chain, and driven by means of a powered sprocket engaged by the chain are used in such operations as the under-cutting of coal. With respect to different sockets on the chain the bits are arranged at different angles so as to effect a width of cut sufficient to clear the cutter chain and its mounting. The cutting elements themselves may take a variety of forms ranging generally from unitary, integral elements consisting of a shank and a cutting head to more elaborate structures comprising a bit holder and a removable or renewable cutting bit proper. The present invention is not limited to the use of any particular type of cutting element structure, and is not exclusive of structures in which a separate cutting bit is engaged in an element having a shank to be held in the chain link socket. It does, however, relate to assemblies in which various chain links are provided with sockets, and the cutting elements, of whatever structure, have unitary shanks for engagement and retention in the sockets. I shall describe my invention in connection with a type of cutting bit having an integral head and shank with a hard cutting insert forming a part of the cutting head.

It will be understood that in mining machinery of this type, the cutting elements are subjected to rapid wear and abrasion as well as to excessive vibration. There is a problem in connection with the holding of the shank in the socket so as to resist loosening under vibration and strain. Moreover, the cutting elements have to be renewed or replaced at frequent intervals. It has been a general practice hitherto to provide for holding the cutting element shank in its socket by means of one or more set screws. As a consequence, considerable time and labor is expended in renewing and replacing the cutting elements; and in many mining operations it is necessary to maintain a crew of men having as a primary or sole duty the maintenance of the cutting elements of such mining machinery.

It is a primary object of this invention to provide a new structure for the mounting of cutting element shanks in the sockets of cutter chains whereby not only are the cutting elements firmly held during the operation of the machine, but their renewal and replacement are greatly facilitated as hereinafter explained.

This and other objects of my invention which will be set forth hereinafter, or will be apparent to one skilled in the art upon reading these specifications, I accomplish by that construction and arrangement of parts of which I shall now describe an exemplary embodiment. Reference is made to the accompanying drawings wherein:

Figure 1 is a partial sectional view of a cutter chain including a cutter chain socket, showing an exemplary cutter bit in exploded relation thereto.

Figure 2 is a similar view showing the cutter bit and socket elements in assembled relationship.

The sockets of a cutter chain are ordinarily formed on those chain elements or links which have two cheeks in spaced relationship. In Figure 1 I have shown in section a socket member 1 formed integrally with the cheeks of a double link element, one of the cheeks being shown at 2. As is well understood, in the cutter chain the various double link elements will be interconnected by single link elements (partially indicated in Figure 1 at 3 and 4); the ends of the single link elements lie between the cheeks of the double link elements and are pivoted thereto by appropriate pintle means 5 and 6. The chain construction illustrated is exemplary and does not constitute a limitation upon the invention, since it may be widely varied.

The socket element 1 has a perforation or opening 7 to receive the shank 8 of a cutting element shown by way of example as having an integral head 9 with a hard cutting insert 10. This form of cutting element will ordinarily be made of hardened steel, the cutting element 10 being a hard alloy such as Carboloy or the like.

The socket element 1 is provided at one side of its opening with a transversely extending pivoting element 11. This element is most conveniently provided by drilling an opening transversely of the socket element and inserting a hardened steel pin or the like which is held against endwise movement by riveting, welding or in any suitable fashion. As illustrated, the pin is so located that it is partially embedded in the socket element at the front or forward side of the socket opening, i. e. in the portion marked 1a of the socket element. This portion may conveniently be made lower than the opposite portion and lateral wall portions of the socket element, as shown. The upper part of the interior wall of the portion 1a is sloped where it meets the pin 11 as shown at 12.

Against the rear wall of the socket opening I affix a heavy spring member 13. This may be done by means of screws, rivets, welding or in any other suitable fashion. The upper part of the spring member is shown as conforming to the rear wall of the socket member opening. The lower portion of the spring member 13 extends into the socket member opening and is provided at its lower end with a nose 14 for a purpose hereinafter described.

The shank 8 of the cutter bit or cutting element has its rear lower edge truncated as at 15 and is also provided with a notch or recess 16 adjacent its lower rear corner. The front edge of the shank 8 is provided with a recess 17 to accept the pin 11.

In inserting the shank of a bit or bit holder into the socket element described, the initial position of the shank is substantially that illustrated in Figure 1, the shank being inserted with a downward slantwise motion (as permitted by the bevelled face 12 at the front side of the socket member opening) until the recess 17 of the shank can be engaged over the pivoting element 11. Thereafter the shank can be brought into full engagement in the recess by tilting the cutting element rearwardly, i. e. in the direction of the solid arrow A in Figure 2. When the bit shank is fully engaged as shown in Fig. 2, the rear, non-truncated edge of the shank will rest against that portion of the spring member 13 which parallels and lies against the rear face of the socket opening. Thus, the bit is enabled adequately to withstand the stresses incident to cutting, which stresses are also in the direction of the arrow A. Any longitudinal movement of the cutting element shank 8 in either direction is resisted both by the engagement of the pivoting element 11 in the recess 17 and also by the engagement of the nose 14 of the spring 13 in the shank recess 16. This last mentioned engagement also prevents rocking motion of the shank 8 about the member 11 as a pivot. The spring member 13 is made strong so that the bit shank will be firmly held in the socket when in final position. This means that considerable force will be required to seat the bit shank. The application of such a force, however, can be easily accomplished as by striking the cutting element head in the direction of the arrow A with a hammer, maul or the like, or by means of a long tool which, engaged with the cutting element, will provide a sufficiently extended lever arm.

The removal of the bit is accomplished essentially by a reversal of the operations just described. Since the spring member 13, while strong is resilient, a sufficiently heavy blow on the rear surface of the cutting element head, i. e. a blow generally in the direction of the dotted arrow B in Figure 2, will disengage the nose 14 from the notch or recess 16 in the shank, causing the shank to pivot forwardly on the pivoting element 11, whereupon it may be withdrawn.

It will be seen that in the use of my construction, the engagement and disengagement of cutting elements from the cutting chain are made substantially instantaneously thus saving a great deal of time and labor in the changing of cutting elements. In the above description, the terms "forward" and "rear" have been used with reference to the direction in which the chain and cutting element move in the operation of cutting.

Modifications may be made in my invention without departing from the spirit of it. By way of example, flattening the rear side of the pivoting element 11 as at 18 will permit the use of a shank 8 having greater forward-to-rear thickness than would otherwise be possible with a pivoting element of the same diameter. The mode of engagement of the spring member 13 with the shank may be varied. The cutting element is preferably fixed in its final seated position by a shoulder 19 which abuts the top surface of the socket member 1. If desired, and as shown in dotted lines at 20 in Figure 2, the rear edge of the cutting element head may be formed with another shoulder lying above the surface of the socket element 1 and serving as a prying abutment to tilt the cutting element for disengagement and removal.

Having thus described my invention in an exemplary embodiment, what I claim as new and desire to secure by Letters Patent is:

1. In a cutter chain assembly, a socket member having an elongated, substantially rectangular socket forming opening therein, a cutting member having an elongated, substantially rectangular shank, a fixedly secured pivoting element located in the opening of said socket forming member intermediate the length thereof and projecting into said opening, said pivoting element being engageable in a depression in the forward edge of said shank, said socket forming member being cut away forwardly above said pivoting element, and the rear lower portion of said shank being cut away, whereby said shank can pivot forwardly in said socket member on said pivoting element and can be rocked rearwardly therein to a position in which the rear face of said shank above said cut away portion can abut a rear face of said socket forming opening to resist cutting strains imposed on said cutting member, the cutaway portion of said shank, when said shank is in its rearward position, lying in spaced relation to the rear face of said socket forming opening to define a space therebetween, and releasable means in the said space engaging said socket member and said shank to prevent forward tilting of said shank and maintain it in said last mentioned position, in which position the engagement of said pivoting element in the depression in said shank prevents axial movement of said shank.

2. In a cutter chain assembly, a member having a socket-forming opening, a cutting member having a shank, a pivoting element in said socket member and engageable with said shank when said shank is in a tilted position, said shank having a rear edge portion adapted to seat against a rear wall of said opening when said shank is fully positioned in said socket, and a spring member having a portion attached to said socket member and a portion constituting a nose adapted to enter a notch in said shank for holding said shank in fully seated position in said socket such that endwise withdrawal of said shank is resisted by said pivoting member.

3. In a cutter chain assembly, a member having a socket-forming opening, a cutting member having a shank, a pivoting element in said socket member and engageable with said shank when said shank is in a tilted position, said shank having a rear edge portion adapted to seat against a rear wall of said opening when said shank is fully positioned in said socket, and a spring member having a portion attached to said socket member and a portion constituting a nose adapted to enter a notch in said shank for holding said shank in fully seated position in said socket such that endwise withdrawal of said shank is resisted by said pivoting member, the portion of said spring member attached to said socket member lying along the rear face of the opening therein and serving as an abutment for the rear edge of said shank.

4. In a cutter chain assembly, a member having a socket-forming opening, a cutting member having a shank, a pivoting element in said socket member and engageable with said shank when said shank is in a tilted position, said shank having a rear edge portion adapted to seat against a rear wall of said opening when said shank is fully positioned in said socket, and a spring member having a portion attached to said socket member and a portion constituting a nose adapted to enter a notch in said shank for holding said shank in fully seated position in said socket such that endwise withdrawal of said shank is resisted by said pivoting member, the portion of said spring member attached to said socket member lying along the rear face of the opening therein and serving as an abutment for the rear edge of said shank, said shank terminating upwardly in a shoulder which, abutting against the upper surface of said socket member, will limit motion of said shank in one direction.

5. In a cutter chain assembly, a member having a socket-forming opening, a cutting member having a shank, a pivoting element in said socket member and engageable with said shank when said shank is in a tilted position, said pivoting element comprising a rod-shaped member engaged in a bore extending transversely of said socket member, said rod-shaped member extending into said socket member opening rearwardly of the front face thereof, said shank having a rear edge portion adapted to seat against a rear wall of said opening when said shank is fully positioned in said socket, and a spring member having a portion attached to said socket member and a portion constituting a nose adapted to enter a notch in said shank for holding said shank in fully seated position in said socket such that endwise withdrawal of said shank is resisted by said pivoting member, the portion of said spring member attached to said socket member lying along the rear face of the opening therein and serving as an abutment for the rear edge of said shank, said shank terminating upwardly in a shoulder which, abutting against the upper surface of said socket member, will limit motion of said shank in one direction.

6. In a cutter chain assembly, a member having a socket-forming opening, a cutting member having a shank, a pivoting element in said socket member and engageable with said shank when said shank is in a tilted position, said pivoting element comprising a rod-shaped member engaged in a bore extending transversely of said socket member, said rod-shaped member extending into said socket member opening rearwardly of the front face thereof, said front face being tapered forwardly above said rod-shaped member, said shank having a rear edge portion adapted to seat against a rear wall of said opening when said shank is fully positioned in said socket, and a spring member having a portion attached to said socket member and a portion constituting a nose adapted to enter a notch in said shank for holding said shank in fully seated position in said socket such that endwise withdrawal of said shank is resisted by said pivoting member, the portion of said spring member attached to said socket member lying along the rear face of the opening therein and serving as an abutment for the rear edge of said shank, said shank terminating upwardly in a shoulder which, abutting against the upper surface of said socket member, will limit motion of said shank in one direction.

7. In a cutter chain assembly, a member having a socket-forming opening, a cutting member having a shank, a pivoting element in said socket member and engageable with said shank when said shank is in a tilted position, said pivoting element comprising a rod-shaped member engaged in a bore extending transversely of said socket member, said rod-shaped member extending into said socket member opening rearwardly of the front face thereof, said front face being tapered forwardly above said rod-shaped member, the lower portion of the rear edge of said shank being truncated, said shank having a rear edge portion adapted to seat against a rear wall of said opening when said shank is fully positioned in said socket, and a spring member having a portion attached to said socket member and a portion constituting a nose adapted to enter a notch in the truncated portion of said shank for holding said shank in fully seated position in said socket such that endwise withdrawal of said shank is resisted by said pivoting member, the portion of said spring member attached to said socket member lying along the rear face of the opening therein and serving as an abutment for the rear edge of said shank, said shank terminating upwardly in a shoulder which, abutting against the upper surface of said socket member, will limit motion of said shank in one direction.

8. In a cutter chain assembly, a socket member having an elongated socket-forming opening therein, a cutting member having an elongated shank extending into said opening, a pivoting element in said opening intermediate the length thereof, a depression in the forward edge of said shank intermediate its length in engagement with said pivoting element, said shank being movable about said pivoting element from a tilted position to a seated position, the lower portion of the rear edge of said shank comprising a cutaway portion extending below said depression to permit the lower end of the shank to clear the rear wall of the said opening as the shank is moved from the tilted to the seated position, the upper portion of the rear edge of the shank comprising a face which seats against the rear wall of the opening when the shank is in the seated position, the cutaway lower rear edge portion of the shank lying in spaced relation to the rear wall of the opening when the shank is in the seated position, and a shank engaging means in the space between the rear wall of the opening and the cutaway lower rear edge portion of the seated shank, said shank engaging means contacting the cutaway lower rear edge portion of the shank and acting to secure the shank in the seated position.

9. The structure claimed claim 8 wherein said shank engaging means comprises a spring means.

10. In a cutter bit structure, an element having an elongated substantially rectangular shank, the front face of said shank having a depression intermediate its ends for engagement with a pivoting element forming a part of a shank receiving member, the rear face of said shank being cut away at an angle at its lower end so as to permit pivoting movement of the shank in a substantially rectangular opening in a shank receiving member, the rear face portion of said shank above the cutaway portion being of greater longitudinal extent than the cutaway portion, whereby the rear face portion is capable of resting against a face of the opening into which the shank is inserted, the rear face of said shank terminating upwardly in an outwardly projecting shoulder adapted to abut against the upper surface of the shank receiving member to thereby limit motion of the shank in one direction.

References Cited in the file of this patent

UNITED STATES PATENTS

| | | |
|---|---|---|
| 300,356 | Gardner | June 17, 1884 |
| 1,091,263 | Waugh | Mar. 24, 1914 |
| 1,586,151 | Hess | May 25, 1926 |
| 2,521,089 | Phipps | Sept. 5, 1950 |